June 16, 1942.    J. TODD    2,286,981

LOCKING NUT

Filed June 25, 1940

INVENTOR:
JOHN TODD,
BY Walter S. Jones ATT'Y.

Patented June 16, 1942

2,286,981

UNITED STATES PATENT OFFICE 2,286,981

LOCKING NUT

John Todd, Lincoln, Mass., assignor to United-Carr Fastener Corporation, Cambridge, Mass., a corporation of Massachusetts Application June 25, 1940, Serial No. 342,231

2 Claims. (Cl. 151—21)

This invention relates to improvements in lock nuts.

An object of my invention is the provision of a lock nut having a tubular internally threaded shank providing a yieldable non-circular portion expansible on engagement of a screw therewith and contractible to bind the screw thereby to prevent relative unloosening of the parts as a result of jar, vibration and the like. The broad idea of a nut device providing a yieldable non-circular portion to bind a screw is not new, but the present invention provides improvements over the known types and is particularly directed to a lock nut substantially cheaper to manufacture and, at the same time, capable of effecting a firmer and more dependable binding action between the screw and nut.

My invention is directed particularly to the provision of a locking means applied to a nut member of the type shown by United States Patent to Kimbell No. 1,873,895, in which construction the nut member is formed of one piece of sheet metal and provides a base and a relatively thin walled shank or barrel drawn from the material of the base.

Referring to the drawing, in which I have illustrated preferred embodiments of my invention:

Figure 1:
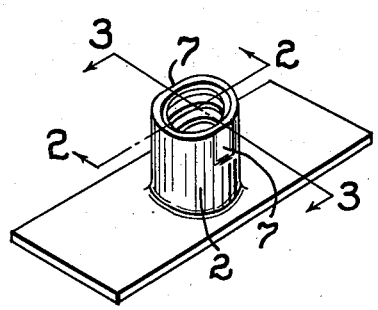
Fig. 1 is a plan view of one form of my improved locking nut.
Figure 2:
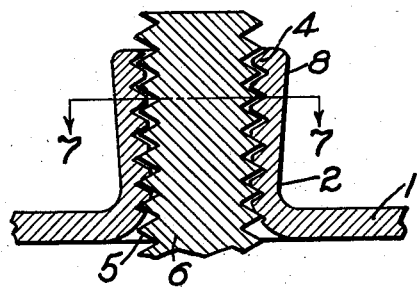
Fig. 2 is an enlarged sectional view taken along the line 2—2 of Fig. 1 and showing a screw in threaded engagement with the nut member.

Referring to my first form of nut member illustrated in Fig. 1, I have shown a nut member which is preferably made from a single piece of sheet metal material. The nut member has a base portion 1 which may be spot-welded or otherwise secured to a surface of a supporting panel (not shown) and a shank or barrel 2 extending in perpendicular relation to the base and formed from the material of the base by a drawing operation. The shank 2 has a relatively thin imperforate wall which is of substantially the same thickness throughout the length of the shank. The shank 2 immediately prior to the operation thereon by which the locking means is formed is cylindrical in shape and of substantially the same outside diameter throughout its length. A thread 4 is provided internally of the shank 2 which extends throughout the length of the shank. The thread 4 is adapted to cooperate with a thread on the shank 5 of an attaching screw 6.

Figure 3:
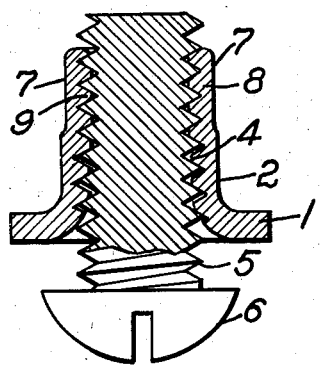
Fig. 3 is an enlarged sectional view taken along the line 3—3 of Fig. 1 showing a screw in threaded engagement with the nut member.
Figure 4:
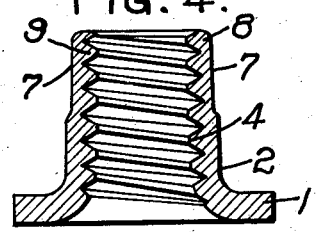
Fig. 4 is a section similar to Fig. 3 and showing the nut member before the screw is engaged therewith.

In providing the locking feature in my first form of lock nut, opposed sides of portions of the shank 2 adjacent the outer end of the shank are pressed inwardly or flattened as at 7—7 so as to provide an oval-shaped locking portion 8, as most clearly shown in Fig. 4. The locking portion 8 is of sufficient length to have at least two full thread turns 9 which are displaced inwardly by the flattening action so that the root diameter of the bore of the non-circular portion through the flattened sides is less than the major diameter of the threaded shank 5. Thus, as a result, the base end of the threaded shank 5 engages regularly the cylindrical portion of the shank, but when the screw thread comes into engagement with the thread of the locking portion, the non-circular portion must yield tending to assume a circular shape. As soon as the screwing action is terminated, the flattened sides of the locking portion tend to contract or resume their normal shape thereby causing at least two full thread turns 9 to bind the screw, as most clearly shown in Fig. 3.

It will be noticed that the non-circular locking portion is formed in such a way that the exterior surfaces of the flattened sides 7—7 extend in planes substantially perpendicular to the plane of the base 1 and the major diameter of the shank bore in an axial plane through the sides 7—7 is constant. As a result of this construction equal pressure upon the screw shank 5 by two or more full thread turns 9 is provided, as shown in Fig. 3, and consequently a firm and dependable binding or dragging action between the threads of the parts is assured.

Figure 5:
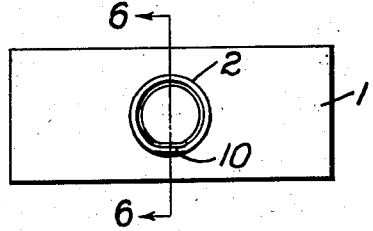
Fig. 5 is a top plan view of a modified form of nut member.
Figure 6:
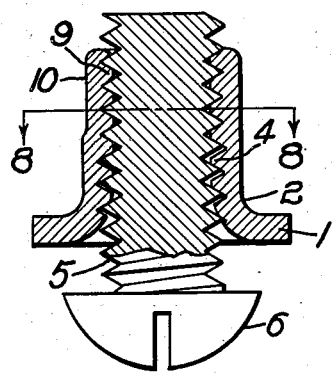
Fig. 6 is an enlarged sectional view taken along the line 6—6 of Fig. 5 and showing a screw in threaded engagement with the nut member.
Figure 7:
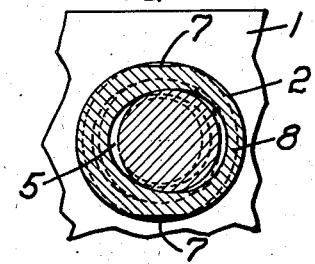
Fig. 7 is a section on the line 7—7 of Fig. 2.
Figure 8:
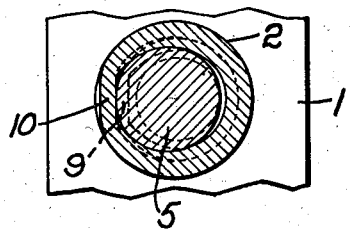
Fig. 8 is a section on the line 8—8 of Fig. 6.

A modified form of my invention is illustrated in Figs. 5, 6 and 8 which differs from my first form only in that instead of flattening two sides of the shank to form the non-circular locking portion, one side 10 alone is depressed. The side 10 is yieldable on threaded engagement of the parts and binds the screw, as shown in Fig. 8, to effect a satisfactory locking action.

Thus by my invention I have provided a locking means which is particularly adaptable to sheet metal nuts of the type which at the present time is sold in large quantities for a variety of uses. The lock nut is capable of cooperative binding engagement with a screw thread to resist a tendency of one of the fastener parts to turn even when subjected to abnormal jar and vibration and for this reason is particularly applicable to use in aeronautical and automotive construction. Also, the nut member retains its binding action after repeated engagement and disengagement of a cooperating screw member therewith. Finally, the lock nut may be manufactured substantialy less expensively in large quantity production than any lock nut now known to be in commercial use.

Although I have illustrated and described preferred forms of my invention, I do not wish to be limited thereby because the scope of my invention is best defined by the following claims.

I claim:

1. A locking nut member having a base, a hollow shank extending from said base, a thread formed internally of said shank for engagement with a screw thread, a portion of said shank being non-circular in cross-section, said shank having walls of substantially the same thickness throughout its length, said non-circular portion having a length equal to at least two full thread turns and with the line of a portion of its exterior surface in perpendicular relation to said base, and said non-circular portion having a root diameter which is less than the major diameter of said screw thread whereby said non-circular portion is expansible by said screw toward normal shape and contractible to bind said screw.

2. A locking nut member having a base, a hollow cylindrical shank extending from said base and originally formed to have a constant outside and inside diameter throughout its length, a thread formed internally of said shank for engagement with a screw thread, said shank having imperforate walls throughout its length, said shank having a non-circular portion formed by depressing a side of said cylindrical shank, said non-circular portion having a length equal to at least two full thread turns, and the major diameter of said thread of said shank in an axial plane through said depressed side being constant throughout the length of said non-circular portion.

JOHN TODD.